United States Patent [19]

Müller et al.

[11] 4,164,690
[45] Aug. 14, 1979

[54] COMPACT MINIATURE FAN

[76] Inventors: Rolf Müller, Ackerstrasse 13, St. Georgen, Schwarzw.; Günter Wrobel, Fürstenbergring 8, Villingen, both of Fed. Rep. of Germany

[21] Appl. No.: 790,928

[22] Filed: Apr. 26, 1977

[30] Foreign Application Priority Data

Apr. 27, 1976 [CH] Switzerland ............... 005294/76

[51] Int. Cl.² .................................... H02K 29/00
[52] U.S. Cl. .................................... 318/254; 310/63; 417/410
[58] Field of Search ............... 318/138, 254; 310/62, 310/63, 68, 268; 417/410

[56] References Cited

U.S. PATENT DOCUMENTS

| 2,068,820 | 1/1937 | Sarazin et al. | 310/62 X |
| 3,840,761 | 10/1974 | Muller | 310/268 X |
| 3,891,905 | 6/1975 | Muller | 310/268 X |
| 3,912,956 | 10/1975 | Muller | 310/268 X |
| 3,961,864 | 6/1976 | Papst et al. | 310/63 X |
| 4,011,475 | 3/1977 | Schmider | 310/268 X |

Primary Examiner—Gene Z. Rubinson
Attorney, Agent, or Firm—Michael J. Striker

[57] ABSTRACT

A compact miniature fan has an air-guidance housing of rectangular parallelepiped configuration. The housing has two opposite end walls and side walls. One end wall is provided with an air inflow opening. One side wall is provided with an air outflow opening. The other end wall comprises a base plate. Mounted within the housing is an electric motor of flat overall shape. The stator and rotor of the motor define a planar air gap. The stator includes a magnetically conductive flux-return structure mounted on the base plate and a stator winding comprised of a plurality of flat coils mounted on the flux-return structure. The rotation axis of the rotor extends in the direction from one to the other of the end walls of the air-guidance housing. A radial fan wheel is provided within the housing, mounted on and coaxial with the rotor of the motor.

37 Claims, 10 Drawing Figures

COMPACT MINIATURE FAN

The invention relates to a compact miniature fan with a radial fan wheel driven by a coaxial electromotor, the fan wheel being enclosed by an air-guidance housing of rectangular parallelepiped configuration, in one of whose end faces the air enters and out of at least one of whose side faces the air discharges.

It relates in particular to such a fan of high rotary speed, with high rotary speed being understood to be above 3500 rpm. Fans of smaller structural dimensions are today used above all in electronic devices in large numbers for cooling of the electronic components. As a result of progress in electronics, these devices are often made very small; it has been found that, with fans provided with conventional means, minaturization without resort to special expedients is not possible beyond a certain extent. This is troublesome in many applications, e.g., in aircraft electronics, where components are very tightly packed together, or with portable devices, e.g., measuring devices, radio devices, or the like. With the last-mentioned devices, there is the additional factor, that the power requirement of the fan (which may be driven inter alia from batteries) should be as small as possible; that is, for such applications, conventional fans with their poor efficiency (10 to 15%) usually cannot be employed. Where efficiency was not the main consideration, the use of known fans of the general type in question involved energization at medium frequency (400 Hz).

An object of the invention is accordingly to be seen in the creation of a compact fan having good air throughput and avoiding the disadvantages in question.

According to the invention this is achieved by the expedients specified in claim 1. With such a construction, the magnetic flux-return structure of the motor simultaneously serves as a reinforcement for the motor housing, that is, it is employed in the fan construction as a load-bearing component. The flat motor of disk-like configuration despite its small dimensions produces a good torque, relatively fast starting, and makes possible a relatively large air inflow cross section and a simple arrangement of the blades of the radial fan within the fan housing, particularly in the case of extremely flat and compact fans. Also, its production is economical.

These flat motors, which are maintenance-free and produce less radio interference, are known as collectorless D.C. motors. The latter have, particularly when they are constructed in accordance with the teaching of U.S. Pat. No. 3,840,761, a very considerable efficiency even at low power, e.g., up to 60% with a 3-watt motor, and they make possible a considerably high air throughput even with small fan sizes, due to the high rotary speed of which they are capable. Because this rotary speed is limited in the upward direction practically exclusively by fan noise, one can, e.g., in aircraft where noise generation plays a small or no role, operate at very high rotary speeds. A further advantage of D.C. motors is that they are optimally matchable to the operating voltages of electronic devices and, e.g., with a voltage of 12 volts particularly good efficiency can be achieved. Also, their rotary speed and accordingly their air throughput is variable within wide limits in a very simple way by varying their operating voltage, so that with a single fan size the needs of various practical applications can be satisfied, i.e., stocking by manufacturers and customers can be very markedly reduced.

Furthermore, battery operation is possible and excellent, e.g., in climate-control systems in buses and cruise tractors, without having to worry about a quick exhaustion of the battery when the vehicle is at a standstill.

Further details and advantageous modifications of the invention are to be found in the illustrative embodiment described below and illustrated in the drawing, but to be understood not to limit in any way the scope of the invention, as well as in the dependent claims.

Figure 1:
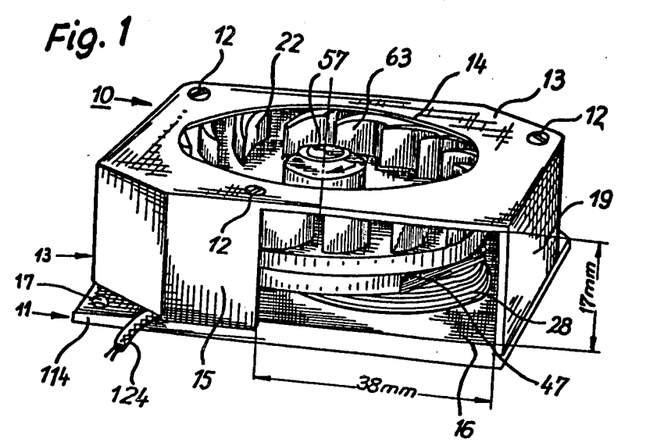
FIG. 1 a first perspective illustration of a radial fan in accordance with the invention on an enlarged scale, with dimensional units being indicated in width and height directions to make clear the dimensions.
Figure 2:
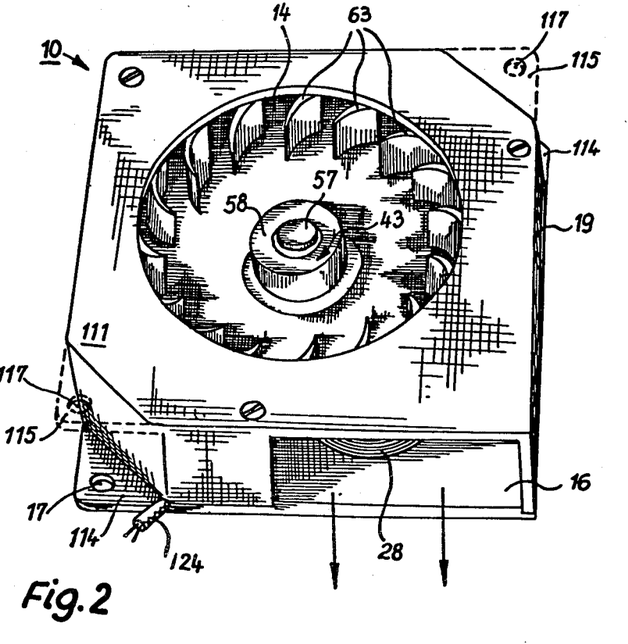
FIG. 2 a second somewhat different perspective illustration of the radial fan of FIG. 1 with a mounting modification indicated in broken lines.
Figure 3:
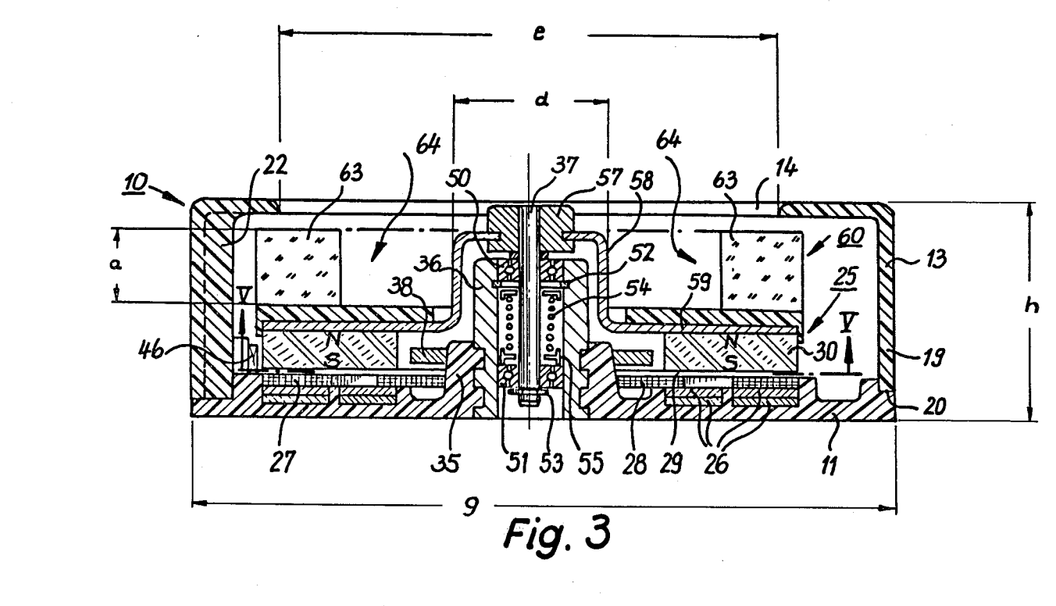
FIG. 3 a section through the radial fan of FIGS. 1 and 2, seen along the line III—III of FIG. 4.
Figure 4:
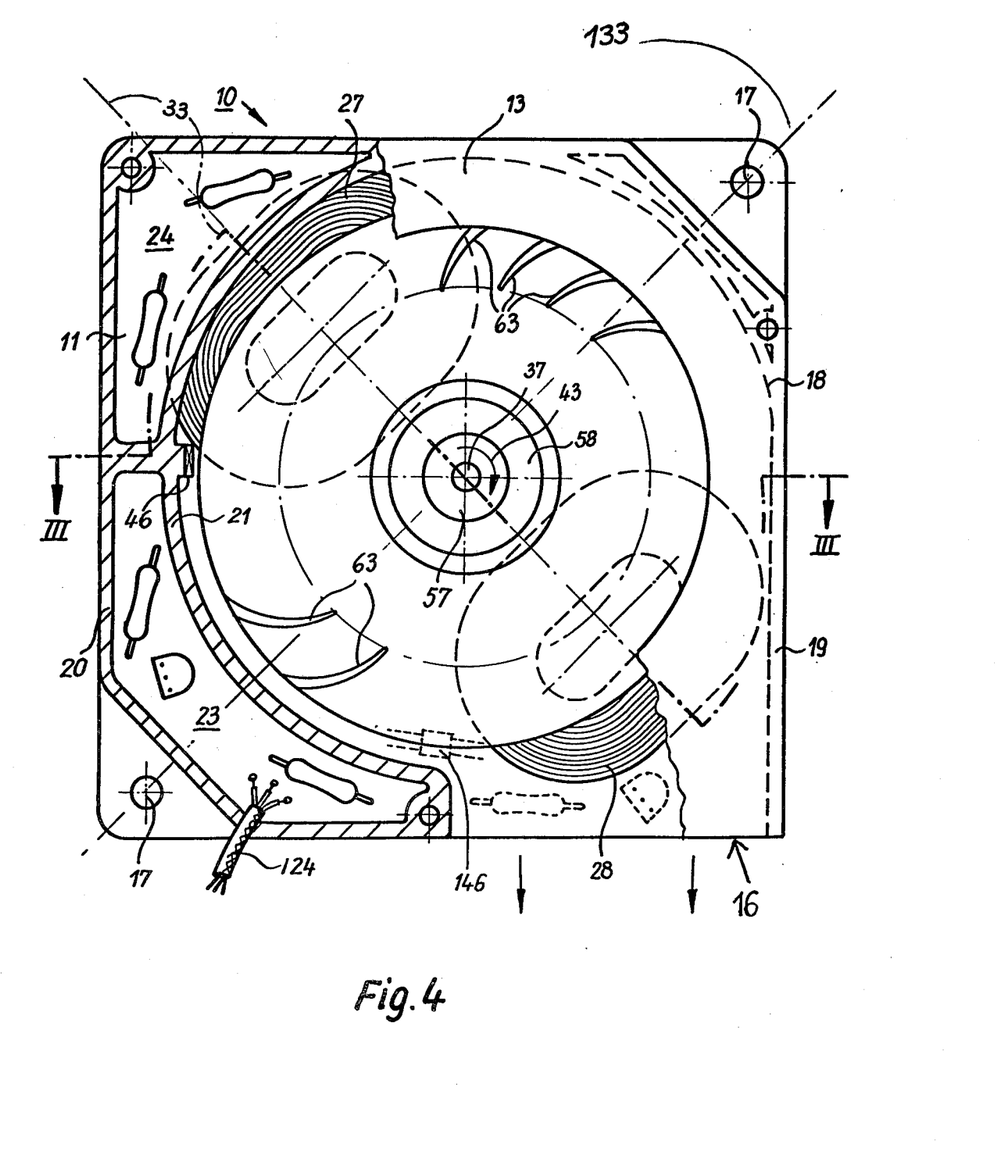
FIG. 4 a partly broken-away top view of the radial fan of FIGS. 1 to 3.

FIGS. 1 to 4 clearly show on an enlarged scale the construction of the radial fan 10. The latter has a base plate 11 designed as a molded item made of synthetic plastic, e.g., fiberglass-reinforced plastic (GFK), upon which there is mounted by means of three screws 12 an upper housing part 13 which preferably is likewise made of GFK; the part 13 has at its upper side a circular air inflow opening 14 and at a forward side wall 15 a rectangular air outflow opening 16 which, for example in the exemplary embodiment and as shown in FIG. 1 for the sake explanation, has the dimensions 17×38. In its entirety, the illustrated radial fan 10 is only about 23 mm high and its base outline is 73×73 mm; i.e., it is extremely flat and compact and has a volume of less than 125 cm$^3$. As particularly clearly shown in FIG. 3, the upper housing part 13 is mounted air-tight on the base plate 11, and the base plate, as shown in FIG. 4, has external recesses 20 for accepting the side walls of the upper part 13 and an internal spiral-shaped recess 21 for accepting a spiral-shaped air guide wall 22 provided on the upper part 13; air guide wall 22 rightward at 18 merges into the backmost section of the right exterior wall 19.

Serving to mount the radial fan 10 are holes 17 on two diametrically opposite corners of the base plate 11, the external wall of the upper part being at these locations set back, as illustrated.

FIG. 2 indicates in broken lines an alternative intended for universal mountability. The tab-shaped extensions 114 of the base plate 11 project beyond the housing part 13 and have mounting holes 17 which lie on the diagonal 133 perpendicular to the straight line 33 in FIG. 4. The cover wall 111 of the upper housing part 13 is shown in FIG. 2 (in broken lines) to likewise have such tab-shaped extensions 115 with mounting holes 117 on the same diagonal 133. By means of the extensions 115, the flanges of the compact fan can be directly mounted on, for example, a housing wall out of which the fan is to suck air.

In the hollow spaces 23, 24 between the recesses 20 and 21 the electronic circuit elements of the motor are arranged, if the motor in accordance with a preferred concept of the invention is designed as a collectorless D.C. motor. A connector cable 124 leads out from the hollow space 23.

The Hall generator 146 shown in FIG. 4 in broken lines and provided as an alternative to 46 lies with its sensitive surface alongside, parallel and with the coil 28 flush at the air gap in the edge region 45, 47 of the magnet 30. This modification, relative to the previous vertical position of the Hall generator 46, permits incorporation of the Hall generator 146 into a printed circuit lying in the same plane, which latter is indicated by the broken-line indication of its electronic elements; this is advantageous in terms of production. These electronic elements are the principal heat-generating components, and as a result furthermore lie in the region of the air flow.

The fan 10 derives its flat form from the construction of the motor driving it, here designed as a flat motor 25. The magnetic flux-return structure of motor 25 is in the form of concentric rings 26 of soft iron; advantageously, these are insulated from one another and are secured in the base plate 11 in the illustrated manner in a recess, e.g., directly during injection (molding) of the base plate 11. If the base plate 11 is produced in an automatic injection cycle, the rings 26 can be incorporated in the injected base plate by means of cement or ultrasonic means more economically with respect to production, than if they were injection-molded in. The rings 26 are, e.g., each about 1 mm thick and are located one within the other in the manner of old-fashioned cooking ranges. Of course, other subdivisions of the magnetic flux-return structure are possible, e.g., by means of radial slits.

Particularly advantageous, especially for high rotary speeds, are straight-line or slightly curved indentations which extend at an angle of 20° to 70°, e.g., 30°, to the tangent at the outer periphery of the flux-return ring in direction away from the respective point of contact of this tangent, so as to have at least the length of the pole spacing (in circumferential direction) and to be at least so densely distributed upon the periphery that each conceivable radial section crosses at least one to two of such indentations. A radial subdivision of the flux-return ring is then unnecessary. The rigidity of a thusly configured flux-return ring is possibly lower, but its effectiveness in suppressing eddy currents is increased. This can be further increased, if the flux-return ring provided with indentations whose cut surfaces still project out of the plate plane, receives by bonding for example an insulating phosphate coating, and then the ring prior to injection in the fan housing is turned flat. By means of this expedient, eddy currents are markedly damped.

An insulating coating is advantageous on the first-mentioned radially subdivided more rigid flux-return rings 26, which serve as a reinforcement for the plate 11 and stiffen the latter particularly well.

The two coils 27 and 28 of the stator are secured directly above the rings 26, e.g., by cementing. These coils can, for example, likewise each have a height of 1 mm, in order to produce a small, magnetically effective air gap 29 of for example about 2 mm between the rotor magnet 30 and the flux-return rings 26. The flux-return rings 26 and the rotor magnet 30, which is designed as an axially polarized 4-pole ring magnet, have about the same basic outline and mutually cover each other over, as clearly shown in FIG. 3.

The coils 27 and 28 have, as illustrated, their middle points each located on a straight line 33 parallel to the longer of the two housing diagonals. In plan view, they have approximately the shape of a sports arena, and their longitudinal axes are each oriented perpendicular the straight line 33. Their magnetically active sections in the illustrated embodiment are spaced from each other by about 140 electrical degrees. They are both two-wire wound and connected to each other with the same sense. From connection A (FIG. 5) of the coil 28, there thus leads a wire through the latter and through the coil 27 to the connection E located there, and the same applies for the connections A' and E'. If, for example, a D.C. voltage is applied between A and E, then both coils generate equally strong magnetic fields with the same direction, e.g., in both cases a north pole on top. The situation is analogous upon application of a D.C. voltage between A' and E'.

An approximately quadratic soft iron piece 38 is fixedly cemented on a central projection 35 of the base plate 11 in which a bearing pipe 36 for receiving the rotor shaft 37 is secured; the short iron piece 38 is located above the two coils and is located axially and radially inward of the magnet ring 30; the soft iron piece 38 is known per se from U.S. application Ser. No. 706,550 and reference is expressly made thereto to avoid unnecessary length; the diagonal of soft iron piece 38 includes an angle $\epsilon$ with the diagonal 33.

The soft iron piece 38 cooperates with the stray flux at the inner periphery 40, in order to generate during motor operation a reluctance torque whose driving components are effective in the gaps of the electromagnetic drive torque, such as is the subject matter, inter alia, of U.S. Pat. No. 3,840,761. The rotational direction of the flat motor 25 is denoted by 43. For a simplified and economical design, the stationary flux-return structure 26 is so designed that it in cooperation with the rotor magnet 30 produces the desired reluctance torque, e.g., by means of V-shaped cut-outs on the outer periphery of the stationary flux-return iron at the spacing of the pole spacing, and the soft feerromagnetic molded piece 38 can then be eliminated. The flux-return ring can then be designed in corresponding shape as a cheap stamped component.

With this design, however, the useful torque may be reduced, since the flux-return cross section is diminished.

Figure 7:
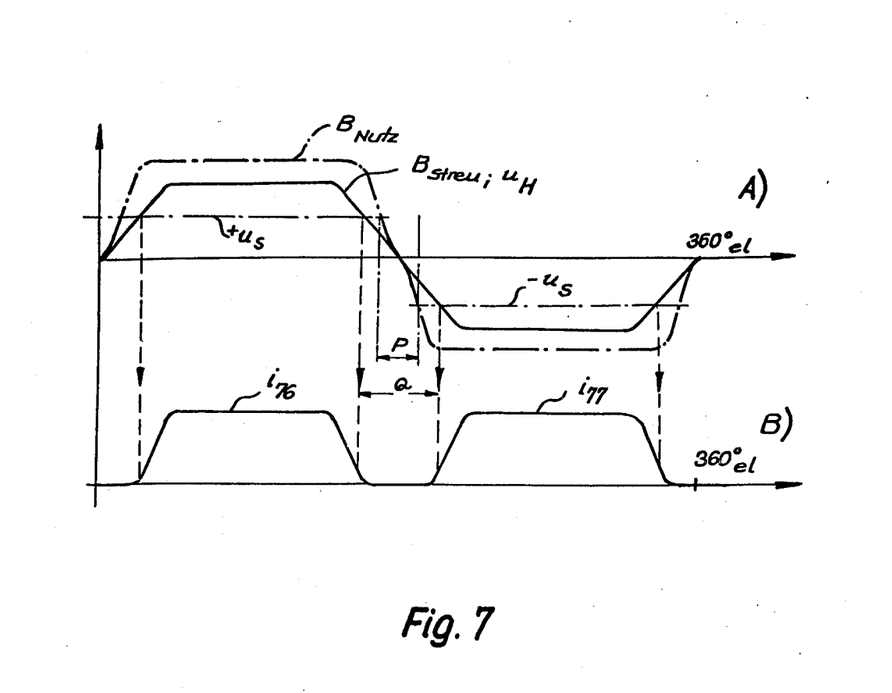
FIG. 7 graphs for explaining the manner of operation.

The magnet ring 30 has a trapezoidal magnetization as schematically denoted in FIG. 7A by Bnutz. Its pole gaps 44—these are not visible upon the ring 30, and are instead merely gaps in its magnetization—are curved from inward toward outward opposite to the rotation direction, which is likewise the subject matter of U.S. Pat. No. 3,840,761, to the contents of which reference is expressly made, in order to avoid lengthiness.

Around the outer ends of the pole gaps 44, the outer periphery 45 of the magnet ring 30 has four clearances in the form of flattened-off portions 47, each occupying an angular range of approximately 50 to 100 electrical degrees, in the exemplary embodiment about 80 electrical degrees; their function cannot be permitted to be interchanged with that of the aforementioned V-shaped cut-outs for the generation of the auxiliary reluctance torque. Arranged on the base plate 11 opposite to these flattened-off portions is a galvanometric sensor 46, which in the exemplary embodiment is located in the stray flux of the rotor magnet and is designed as a Hall-IC, e.g., of the type Honeywell 63 SS 2 C.

This Hall-IC is controlled by the stray flux $B_{Streu}$ (FIG. 7A) at the outer periphery 45, and due to the flattened-off portions 47 of which one is also visible in FIG. 1, this stray flux has relatively large gaps Q which are substantially wider than the narrow pole gaps P of the useful flux in the air gap 29. By means of this simple expedient, if the magnet ring 30 is made for example from a mixture of hard ferrites and rubber or the like, i.e., a so-called rubber magnet, then one can simply stamp it out in its entirety in its final form—here however for the generation of a desired shape for the Hall voltage—and in the case of the magnetization practically no more concern about the form of this output voltage $u_H$ of the Hall-IC 46 need be taken, since $u_H$ (this voltage is practically proportional to $B_{Streu}$) can be modified in a very simple way by alteration of the flattened-off portions 47.

The shaft 37 is journalled in the bearing pipe 36 by means of two ball bearings 50 (upper) and 51 (lower). 50 bears with its outer ring against a circlip 52 which is secured in the bearing pipe 36. The inner ring of 51 bears against a circlip 53 on the shaft 37, as a result of which the spring 54 supported upon the circlip 52 presses a ring 55 against the outer ring of 51 and the latter is therefore axially braced against the inner ring. Due to the magnetic axial pull in the air gap, the inner and outer ring of the ball bearing 50, too, are axially braced to each other, so that both bearings turn without play, which is very important for quietness of operation and service life at high rotary speeds.

At the upper end of 37 there is secured a bushing 57, and on the latter there is secured a deep-drawn hat-shaped molded piece 58 which surrounds the bearing pipe 36 at a small spacing and on whose flat part 59, corresponding to the brim of the hat, at the underside thereof, the ring magnet 30 is fixedly cemented, and at the upper side of part 59, a molded part 60 is secured, e.g., by rivets; at the periphery of the molded part 60 there are provided sixteen radial fan blades 63, whose shape can be clearly seen from FIGS. 1 and 2.

Because the section of the molded part 58 corresponding to the upper part of the hat closely surrounds the bearing pipe 36, one obtains a large air inflow cross section and simultaneously an excellent, very stable mounting of the fan wheel 60, so that air (arrow 64 in FIG. 3) can readily flow into the fan, with little air resistance produced at the inflow side. Furthermore, despite the small overall height of the radial fan 10, there is nevertheless available for the blades 63 a considerable structural height; and naturally one could by increasing the height of the fan markedly increase this blade height without resort to special expedients, from which it is clear that the space utilization, if one lengthened the blades for example to twice the thickness of the housing parallelepiped, would increase drastically, and such a fan in conjunction with the large inflow cross section produced by the invention can be configured very advantageously with respect to flow.

The invention is additionally advantageous for cube-shaped and similar compact miniature fans, of course assuming that radial fan wheels are employed, since they assure a small ratio d/e and, if one increases the axial blade dimension a up to a cube-shaped configuration for the fan, the ratio a/h becomes greater (and better). The combination of minimal d/e and maximal a/h is optimal for the volume within the fan housing utilized for flow (a, d, e, h; see FIG. 3). h is the axial dimension, g the dimension of the housing corresponding to the diameter of the fan wheel; a is the effective axial blade length.

Even the air outlfow cross section, i.e., the opening 16 in FIGS. 1 and 2, is remarkably large, a/h, i.e., despite the small dimensions of the fan wheel 10 (as illustrated) one achieves in its useful rotary speed range (about 3000 to 7000 rpm) a very good air throughput with low power consumption (about 3 watts at 4500 rpm).

Figure 5:
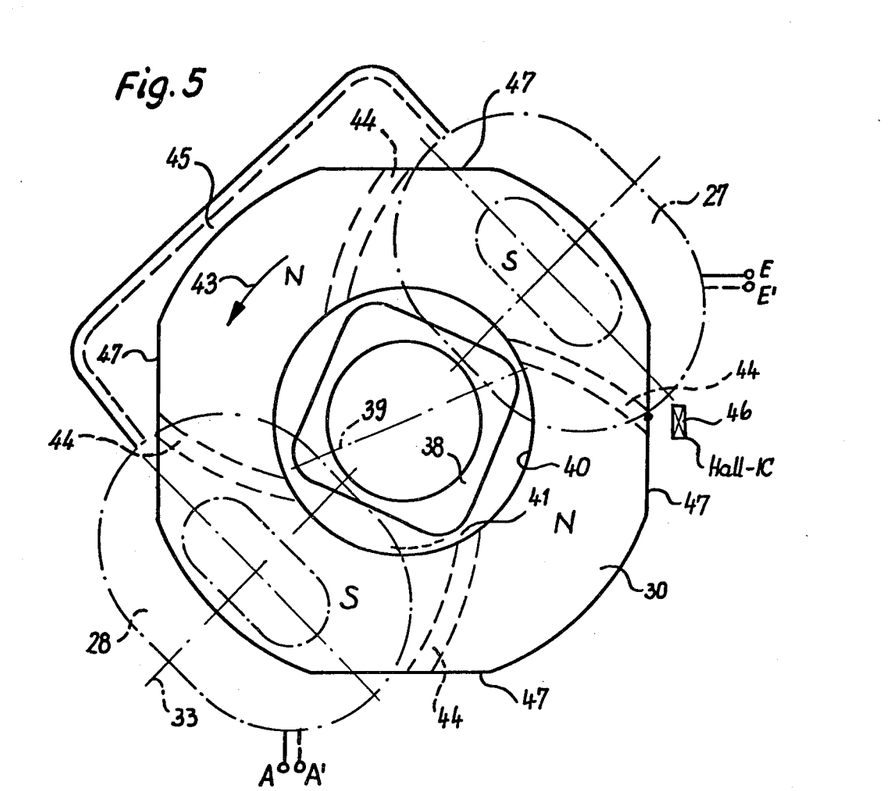
FIG. 5 a section, seen along the line V—V of FIG. 3, with some details of the shaft mounting not being illustrated.
Figure 6:
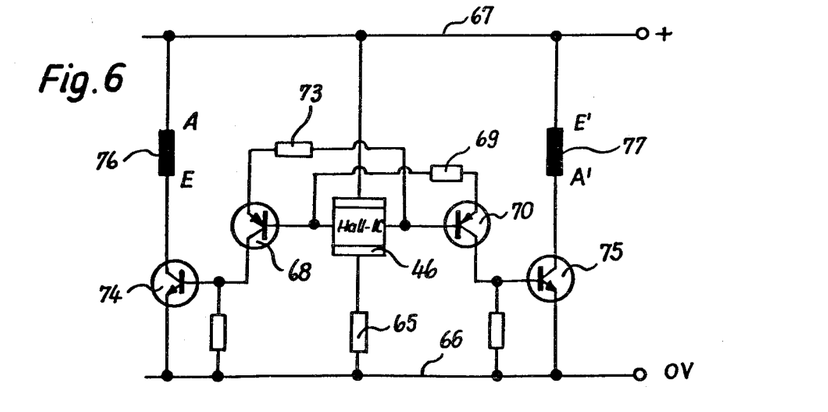
FIG. 6 a circuit for powering the radial fan of FIGS. 1 to 5.

In order to better explain the purpose to be achieved by the flattened-off portions 47, FIG. 6 depicts a circuit for controlling the current in the motor windings. These are denoted in FIG. 6 by A, A' and E, E', just as in FIG. 5. Of course, the circuits of U.S. application Ser. No. 570,837 could also be used, with the blocking-protected circuits of both Offenlegungsschriften also deserving mention in particular, since these blocking-protected circuits are particularly advantageous in the case of fans.

According to FIG. 6, one current terminal of the Hall-IC 46 is connected via a resistor 65 with a negative line 66, the other directly with a positive line 67. Its left output leads directly to the base of a pnp transistor and—via a resistor 69—to the emitter of a pnp transistor 70. The right output of 46 leads to the base of 70 and—via a resistor 73—to the emitter of 68. 69 and 73 are negative-feedback resistors of for example 1000 ohms each, and they serve to make the motor currents almost into an image of the variation of $u_H$ above or below a threshold value denoted in FIG. 7A by $+u_s$ or $-u_s$, respectively. The collector of 68 leads to the base of an npn power transistor 74, the collector of 40 to the base of an npn power transistor 75. Between the collectors of 74 and 75 and the positive line 67 are connected the two motor windings 76 and 77, whose winding-senses are indicated by the capital letters.

During operation of the IC 46, if a pole gap 44 or the region surrounding it is located opposite to a flattened-off portion 47, its left and right outputs have approximately the same potential, and 68 and 70 are both nonconductive, likewise 74 and 75. When then the end of a flattened-off portion 46 approaches, so that for example its left output becomes more negative and its right output more positive, it will still be the case that neither of the transistors 68 or 70 will conduct, since the threshold voltage $u_s$ of transistor 68 has still not been reached. Only when $u_H$ becomes larger than $u_s$ will transistors 68 and 74 conduct, the winding 76 receive current, and the current $i_{76}$ in the manner shown in FIG. 7B increases monotonically, i.e., without jumps. When the next flattened-off portion 47 is reached, one will again fall below $u_s$ and $i_{76}$ becomes zero. Next, then—in FIG. 6 the circuit is completely symmetrical—in a completely analogous manner the winding 77 is switched on. The motor currents $i_{76}$ and $i_{77}$ are thus switched on and off gradually, and one achieves in the desired way a large current gap Q, which inter alia contributes very much to quiet operation of the motor, increases efficiency, and loads the transistors 74 and 75 minimally, since both the switch-on and the switch-off of the motor current coincides with a high counter-emf in the windings.

All the components of the circuit of FIG. 6 can be conveniently provided in the hollow spaces 23 and 24 of the housing. The solution with the Hall-IC in the stray field is thus a preferred solution precisely for very small radial fans; it signifies, however, a certain expense.

Of course, by suitably shaping the pole gaps 44 (cf. e.g. the U.S. application Ser. No. 570,873, FIG. 4), the sensor 46 could also be arranged in the air gap 29, i.e., in the region of useful flux, in which case a conventional Hall generator would suffice.

A flat motor according to the invention is, with respect to economical manufacture, realizable even in mass production particularly with the further disclosed modifications.

Figure 8:
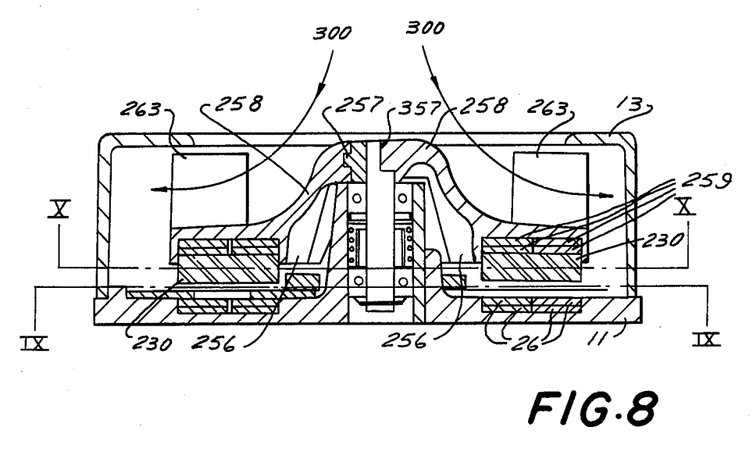
Figure 9:
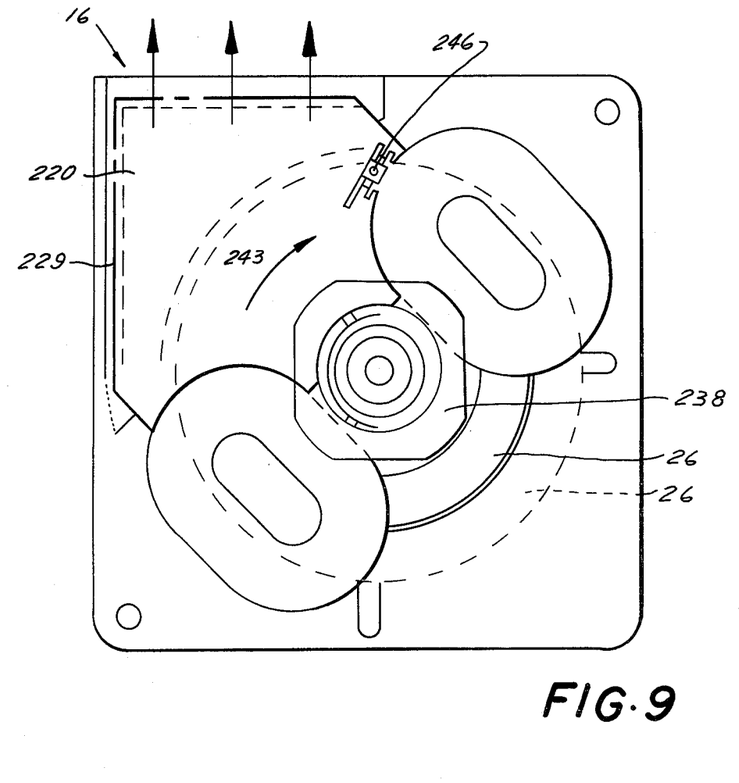

FIG. 8 depicts a section similar to FIG. 3, through a third exemplary embodiment, but at true scale FIG. 9 depicts the section according to line IX—IX of FIG. 8

Figure 10:
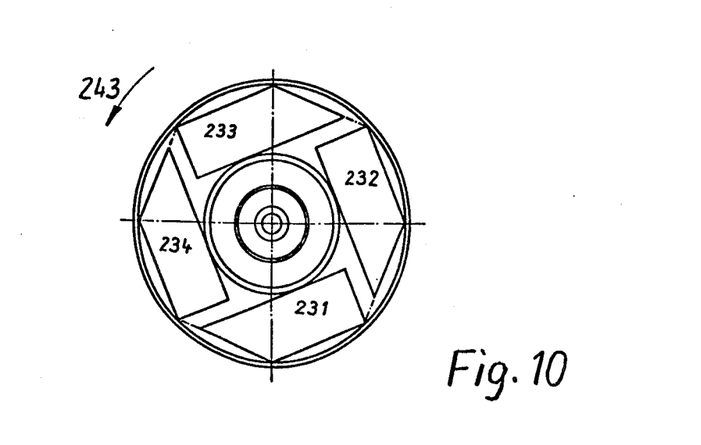

FIG. 10 shows the section according to line X—X of FIG. 8.

The third exemplary embodiment depicted in FIGS. 8 to 10 offers in this connection an advantageous alternative solution and is, in other respects, to a great extent constructed the same as in the relevant preceding Figures.

This can be seen from such a use of reference characters which is the same as in FIGS. 1 to 7 or else is missing.

The different parts, however, are differently denoted.

The fan housing of FIGS. 8 and 9 has the dimensions: h=25 mm, g×g=76 mm×76 mm. The plate 220 indicated in FIG. 9 as a circumferential edge by means of the broken line 229 has (similarly to what was described relative to FIG. 4) a printed circuit which contains the entire electronics with the conductor connections including the connections to the stator windings. Mainly, the power components on it are located between the periphery of the fan wheel and the discharge opening 16 in the region of the air flow. The rotor-position detector is arranged as a "normal" Hall generator 246 (without IC) in the region of useful flux (greater induction than in the stray field) of the motor, i.e., inward of the ring magnet 230 on the plate.

FIG. 8 depicts in contrast to the embodiment of FIG. 3 a hat-like molded piece 258 which not only favors the entrance of the flow (arrow 300) due to a truncated-cone-shaped hub, but which as a synthetic plastic molded part in one-piece fashion with the blades 263 forms the fan wheel and advantageously from the economic standpoint holds encompassed the same flux-return rings 259 (as denoted by 26 on the stator), on which the permanent ring 230 of the rotor is magnetically and mechanically secured. Its structure is formed, with almost complete motoric quality according to FIG. 10, by component magnets 231 to 234 which are trapezoidal and identical to each other and which can be formed from strip material in pairs without any waste of material using the simplest tools; the trapezoidal form of these magnets is determined by two right angles and one 45° angle. The distances between neighboring component magnets forms the pole gaps, here as in FIG. 5 inclined in the rotation direction 243 proceeding from outward to inward.* The hat-like molded piece 258 can also be made of a light-metal pressure-molded part (made of Al or Mg alloy).
*reversal: see claim 20.

The hub is stiffened by radial planar ribs 256, while there is injection molded in them a metal bushing 257 with an out-of-round edge in which the shaft 37 is force-fitted. Alternatively, a shaft with a locally (at the location 357) roughened surface is inserted in the molded piece 258 non-rotatable relative thereto, e.g., cemented in.

In FIG. 5 the angle η is indicated. It is the acute angle (<90°) *between the straight line (33) through the coil centers and the next-lying, considered opposite to the rotation direction (43), normal (133) (perpendicular) on one end face (indentation) of the reluctance iron (38) (or the next-lying, considered opposite to the rotation direction 43, angle-bisecting line (133) between two projections (38') and (38") on the reluctance iron (38)).
*i.e., smaller than 90°

The angle η amounts optimally, with a rotor having p pole pairs to $$\eta_o = \pi/2p$$

if the pole gaps (denoted by 44 in FIG. 5) are radially oriented.

The optimal value for η with inclination of the pole gaps from radially outward toward radially inward in the rotation direction, is $\eta_o$ to $\frac{2}{3} \times \eta_o$ (with greater inclination decreasing).

The optimal value for η with inclination of the pole gaps from outward toward inward counter to the rotation direction of the rotor is $\eta_o$ to 4/3 $\eta_0$ (with greater inclination increasing).

Between the angles ε and η there exists the general relationship $$\eta = \epsilon + \pi/2p.$$

We claim:

1. A compact miniature fan, comprising an air-guidance housing of rectangular parallelepiped configuration having two opposite end walls and side walls, one of the end walls being provided with an air inflow-opening, one of the side walls being provided with an air outflow opening, the other of the end walls being comprised of a base plate; an electric motor of flat overall shape mounted within the housing, the motor comprising a rotor and a stator together defining a planar air gap, the stator including a magnetically conductive flux-return structure mounted on the base plate and a stator winding comprised of a plurality of flat coils mounted on the flux-return structure, the rotation axis of the rotor extending in the direction from one to the other of the end walls of the housing; and a radial fan wheel within the housing mounted on and coaxial with the rotor of the motor.

2. The fan defined in claim 1, said other end wall of the housing being a closed end wall and consisting of the base plate.

3. The fan defined in claim 1, the base plate being generally rectangular, the flat coils comprising two flat coils located on one diagonal of the base plate.

4. The fan defined in claim 3, the motor being a four-pole motor, the flat coils in plan view having the elongated and approximately elliptical shape of a racetrack, the longitudinal axis of each flat coil extending generally perpendicular to said diagonal.

5. The fan defined in claim 4, the magnetically active sections of the coils being spaced from one another by about 130 electrical degrees.

6. The fan defined in claim 1, the magnetic flux-return structure comprising a plurality of concentric and co-planar annular plates made of soft ferromagnetic material.

7. The fan defined in claim 6, the concentric annular plates being insulated from each other.

8. The fan defined in claim 1, the magnetic flux-return structure of the stator being at least partly embedded within the material of the base plate, whereby to reinforce the base plate.

9. The fan defined in claim 2, the stator furthermore including a bearing pipe mounted on the base plate, the rotor including a rotor shaft journalled on the bearing pipe, the rotor furthermore comprising a hat-shaped structure including a central crown-shaped part mounted on the rotor shaft and a surrounding radially outwardly extending annular brim-shaped part, the annular brim-shaped part carrying the generally radial fan blades of the radial fan wheel.

10. The fan defined in claim 9, the hat-shaped structure being a deep-drawn sheet-steel element, the crown-shaped part surrounding the bearing pipe and extending into the brim-shaped part in the direction from said one to said other end wall of the housing, the fan blades being provided on the side of the brim-shaped part which faces said one end wall of the housing, the rotor furthermore including a permanent-magnet rotor-magnet structure mounted on the side of the brim-shaped part which faces the base plate.

11. The fan defined in claim 1, the fan wheel being a one-piece molded element mounted on the side of the rotor facing away from the base plate.

12. The fan defined in claim 1, the rotor being a permanent-magnet rotor.

13. The fan defined in claim 1, the motor being a collectorless D.C. motor and including a magnetic-field-responsive transducer operative for generating a signal indicative of the angular position of the rotor, and control circuit means operative in dependence upon said signal for controlling the energization of the coils of the stator winding.

14. The fan defined in claim 13, the rotor-position transducer comprising a Hall generator.

15. The fan defined in claim 13, the rotor being a permanent-magnet rotor, the rotor-position transducer being arranged in the stray-flux region of the rotor.

16. The fan defined in claim 13, the rotor-position transducer including an element having a field-sensitive surface, this element being so arranged that the field-sensitive surface is located alongside and flush with the face of one of the flat coils of the stator at the planar air gap of the motor.

17. The fan defined in claim 15, the permanent-magnet rotor comprising an annular axially polarized permanent magnet, the axially polarized pole sectors of the annular magnet being separated by intermediate pole-gap sectors, the annular permanent magnet at each of its pole-gap sectors having a reduced-diameter setback.

18. The fan defined in claim 17, the reduced-diameter setbacks being flat setbacks, each setback having an angular span corresponding to between about 50 and 100 electrical degrees.

19. The fan defined in claim 17, the axially polarized permanent magnet of the rotor being a stamped member made of a mixture of hard ferrites and rubber or synthetic plastic.

20. The fan defined in claim 17, the setbacks being flat peripheral setbacks.

21. The fan defined in claim 15, the permanent-magnet rotor comprising an annular axially polarized permanent magnet, the axially polarized pole sectors of the annular magnet being separated by intermediate pole-gap sectors, each pole-gap sector being inclined relative to the radial direction, the inclination being such that as one proceeds along the length of each pole-gap sector from the radially innermost to the radially outermost part thereof the pole-gap sector extends in the direction opposite to the rotation direction of the rotor, the rotor-position transducer being located just ahead of one of the flat coils of the stator when considered in the direction of rotor rotation.

22. The fan defined in claim 13, the rotor being a permanent-magnet rotor comprising an annular axially polarized permanent magnet, the axially polarized pole sectors of the annular magnet being separated by intermediate pole-gap sectors, the circumferential distribution of the magnetization of the annular magnet being generally trapezoidal, and the angular span of the pole-gap sectors being small compared to that of the pole sectors.

23. The fan defined in claim 22, the stator furthermore including at the inner side of the annular rotor magnet a soft ferromagnetic element located and configured to produce a cooperation with the rotor magnet a reluctance torque when the rotor is in the angular positions thereof corresponding to gaps in the electromagnetic torque of the motor.

24. The fan defined in claim 1, the stator furthermore including a bearing pipe mounted on the base plate, the rotor being a permanent-magnet rotor and including a rotor shaft, further including two axially spaced ball bearings journalling the rotor shaft on the bearing pipe, the motor including means for axially stressing at least one of the two ball bearings to reduce rotor play in the axial direction.

25. The fan defined in claim 24, the means for axially stressing at least one of the two ball bearings being comprised by portions of the rotor extending between the permanent-magnet structure thereof and the rotor shaft and operative for transmitting axial stressing force to at least one ball bearing by deriving that force from the axial force of attraction between the permanent-magnet structure of the rotor and the flux-return structure of the stator.

26. The fan defined in claim 24, the means for axially stressing at least one of the ball bearings comprising biasing spring means axially braced against such ball bearing.

27. The fan defined in claim 26, the bearing pipe being provided with a radially inwardly extending stop, the one of the ball bearings which is axially stressed being provided with an annular bearing member, the biasing spring means comprising a stationary biasing spring confined between and braced against the stop and the annular bearing member.

28. The fan defined in claim 1, the volume occupied by the housing of the fan being smaller than 400 cm$^3$.

29. The fan defined in claim 28, the volume occupied by the housing of the fan being smaller than 200 cm$^3$.

30. The fan defined in claim 13, the collectorless D.C. motor having a rated speed higher than 3500 rpm.

31. The fan defined in claim 30, the power consumption of the motor being at most 3 watts.

32. The fan defined in claim 13, the air-guidance housing furthermore including a generally spiral-shaped air-guide wall between the end walls of the housing, the spiral-shaped air-guide wall being radially spaced from the radial fan wheel by a distance which decreases proceeding in the direction of rotation of the fan wheel, the spiral-shaped air-guide wall together with at least one of the side walls defining at least one internal compartment, said control circuit means of said collectorless D.C. motor including electronic components housed within said internal compartment.

33. The fan defined in claim 1, the magnetically conductive flux-return structure having recesses distributed about the rotation axis of the rotor, the recesses being so configured and angularly located as to produce in cooperation with the rotor of the motor a reluctance torque when the rotor is in the angular positions thereof corresponding to the gaps in the electrogmagnetic torque of the motor.

34. The fan defined in claim 28, the overall dimension of the housing measured in the direction of a diameter of the rotor being approximately three times as great as the overall dimension of the housing measured in the direction of the rotor rotation axis.

35. The fan defined in claim 28, the housing being approximately a cube.

36. The fan defined in claim 28, the overall dimension of the housing measured in the direction of a diameter of the rotor being between about one and three times as great as the overall dimension of the housing measured in the direction of the rotor rotation axis.

37. The fan defined in claim 1, the fan wheel being mounted on the side of the rotor facing away from the base plate, the fan wheel not encircling the magnetic circuit structure of the motor but instead being axially adjacent the magnetic circuit structure of the motor.

* * * * *